Patented Apr. 19, 1938

2,114,588

UNITED STATES PATENT OFFICE 2,114,588

HOG CHOLERA VACCINE AND METHOD OF PRODUCTION

William H. Boynton, Berkeley, Calif.

No Drawing. Application August 3, 1934, Serial No. 738,301

6 Claims. (Cl. 167—80)

This invention relates to a hog cholera vaccine and method of production.

It is the practice in this country at the present time to immunize pigs against hog cholera by first inoculating with the hog cholera virus and then with an anti hog cholera serum. This procedure is open to the serious objection that since the pig is first given the disease the premises are infected and if the anti hog cholera serum is not sufficiently potent the pigs may die of the disease rather than merely being immunized. In some countries, for example such as England and Canada, the practice of this method is prohibited for the reasons above given. In these countries, it is the practice when necessary to inoculate pigs with a relatively large dose of anti hog cholera serum. This procedure is also open to objections for the anti hog cholera serum protects the pig only for a short period after which the pig is again susceptible to the disease and furthermore the serum used in large quantities is too expensive.

In general the object of this invention is the provision of a modified hog cholera vaccine and the process for producing it.

More specifically the object of the invention is to so treat the hog cholera virus that it loses its killing power without destroying its antibody inducing properties.

Another object of the invention is the provision of a reagent by means of which a hog cholera virus may be so modified or attenuated that it will immunize the pig without giving him the disease.

The invention possesses other objects some of which with the foregoing will be set forth in the following description.

The hog cholera virus has two properties, one the power to give the disease or to kill and the other to induce or stimulate within a pig the production or secretion of antibodies.

In general the vaccine comprises hog cholera virus attenuated by means of an essential oil preferably in the presence of a dispersing agent such as a testicular extract, rendered sterile with respect to secondary organisms and having the same characteristics with respect to pH values and osmotic pressure as does the body fluid.

Briefly this vaccine may be produced by taking pig tissues super-charged with hog cholera virus and preferably including a testicular extract, rendering this material sterile with respect to secondary organisms by the use of a phenol solution, adding a small quantity of an essential oil such as a terpene, ketone, aldehyde or organic oxide to attenuate the hog cholera virus to a degree that the virus will lose its killing power but not its antibody inducing properties, grinding the mass to a sufficient fineness that it will pass through a hypodermic needle and then bringing this product to the desired fluidity and body characteristics such as pH value and osmotic pressure by the addition of a buffered isotonic solution.

More specifically the technique involved is as follows:

Healthy pigs highly susceptible to hog cholera are injected with hog cholera virus. Morning and afternoon temperatures are recorded daily and when the animals develop a high temperature accompanied by two or more symptoms such as drowsiness, inappetence, emesis, or possibly convulsions, they are killed for vaccine production.

The tissues, supercharged with the virus, such as the lymphatic glands, spleen, kidneys, portions of the lungs showing petechial hemorrhages, testicles, spinal cord, brain and red marrow of bone are removed from the animal as aseptically as possible. The fat, fascia, and connective tissue are cut away from these tissues which are then immersed in a 3% phenol solution with frequent agitation for ten minutes to disinfect the tissue surfaces. The phenol solution is poured off and the tissues allowed to drain for a few minutes.

The tissues so sterilized are finely ground and then passed through a fine mesh screen. The finely ground and macerated tissue mixture is measured into a sterile graduate and to the mixture is added one third its own volume of buffered glycerin having a pH value lying between 7.2 and 7.6 and a very small quantity of a hog cholera attenuating agent.

Certain terpenes, sesqui-terpenes, bicyclic sesqui-terpenes, ketones, aldehydes and organic oxides such as for example pinene, phellandrene, aromadendrene, eudesmol, piperitone, aromadendral and cineole can be used effectively either individually or in combination as the attenuating agent. These essential oils are present in many vegetable oils and some of them at least can be produced synthetically. Eucalyptus oil however is the most convenient source, usually containing two or more of them in combination and can itself be used without modification as an attenuating agent. I have found that the addition of from 0.5 to 5.0% of eucalyptus oil to the tissue mixture above prepared will serve to modify the hog cholera virus to the required extent.

Although eucalyptus oil is a source of the essential oils above referred to it has been found that these oils when used individually are far more potent than eucalyptus oil and therefore when used as an attenuating agent care must be taken to use them in sufficiently small quantities to avoid attenuating the hog cholera virus to the extent that the virus will no longer induce the formation of antibodies within the animal vaccinated. This is particularly true when phellandrene, aromadendral or cineole are resorted to either individually or in combination.

Aromadendral, for the purposes of this specification, is intended to denote a mixture of tecuminal, phellandral and cryptal aldehydes.

The tissue mixture prepared and treated as above set forth is then placed in a sterile motor driven ball mill, which is turned for from 12 to 24 hours in a refrigerated room, the temperature of which varies from 2 to 10° centigrade. Next the mixture is passed through a fine mesh wire strainer with the aid of a pestle. The connective tissue remaining in the strainer is discarded and the strained portion is measured again in a sterile graduate. One third its volume of isotonic buffer solution having a pH value of 7.4 is added and the entire contents are thoroughly mixed and poured into amber glass bottles, which are tightly stoppered and stored in the refrigerator.

Each lot of vaccine is tested for potency and the dose adjusted from this test. The dose varies from 5 to 15 cubic centimeters depending on the size of the animal.

The vaccine may be administered either intramuscularly, intra-dermally or intra-peritoneally. If the vaccine is injected intra-peritoneally it should be heated to 40° C. at the time of injection to avoid shock.

The vaccine produced as above outlined can be used to inoculate healthy weaned pigs but should not be used to inoculate pigs which are exposed to hog cholera or are in the incubative period of the disease.

A period of two weeks following vaccination is required to develop in pigs the resistance necessary to withstand exposure to the hog cholera virus either by inoculation of the virus or by direct contact with infected hogs, or premises infected with hog cholera virus.

Pigs inoculated with this vaccine may be kept in direct contact with susceptible pigs without danger of transmitting infection to them through cohabitation during the period the vaccinated pigs are developing resistance to hog cholera.

It should be noted that although a large number of pig tissues super-charged with hog cholera virus have been used as the basis for the vaccine above described good results can be obtained by the use of a lesser number of these tissues, the main object being to obtain the hog cholera virus in its natural host. The fat and fascia and other connective tissues are discarded merely for the reason that they are not supercharged with the virus. Phenol solution is used for the reason that it kills the secondary organisms which may be present on the surface of the tissues but not the hog cholera organisms which are within the tissues. The isotonic buffer solution used consists of the primary and secondary phosphates in which the osmotic pressure happens to be the same as the body fluids from which the virus is taken. It is added to give the vaccine a more liquid consistency and acts as a vehicle without impairing the potency of the vaccine.

Although desirable, a dispersing agent such as the testicular extract above referred to is not essential and therefore my vaccine can be prepared from either male or female hogs. "Testicular extract" as herein used merely refers to the finely ground and mascerated testicles prepared simultaneously with the other tissues.

I claim:

1. A hog cholera vaccine comprising hog cholera virus attenuated with any reagent selected from the group consisting of eucalyptus oil, eucalyptol, phellandrene, and piperitone, in an amount sufficient to eliminate the disease producing power of the virus without destroying its immunizing power.

2. A hog cholera vaccine comprising hog cholera virus attenuated with not more than 5% of any of the following reagents: eucalyptus oil, eucalyptol, phellandrene, and piperitone.

3. A hog cholera vaccine comprising hog cholera virus attenuated with not more than 1% of any of the following reagents: eucalyptus oil, eucalyptol, phellandrene, and piperitone.

4. A hog cholera vaccine comprising tissues containing hog cholera virus but substantially sterile with respect to secondary organisms; any reagent selected from the group consisting of eucalyptus oil, eucalyptol, phellandrene, and piperitone in an amount sufficient to eliminate the disease-producing power of the virus without destroying its immunizing power; and an isotonic vehicle.

5. The method of producing a hog cholera vaccine comprising: rendering tissues charged with hog cholera virus substantially sterile with respect to secondary organisms; attenuating the hog cholera virus by the addition of a small quantity of any reagent selected from the group consisting of eucalyptus oil, eucalyptol, phellandrene, and piperitone; and bringing the resultant product to the desired fluidity by the addition of an isotonic buffer solution.

6. The method of producing a hog cholera vaccine comprising: rendering tissues charged with hog cholera virus substantially sterile with respect to secondary organisms; and attenuating the hog cholera virus by the addition of a small quantity of any reagent selected from the group consisting of eucalyptus oil, eucalyptol, phellandrene, and piperitone.

WILLIAM H. BOYNTON.